Patented Nov. 10, 1925.

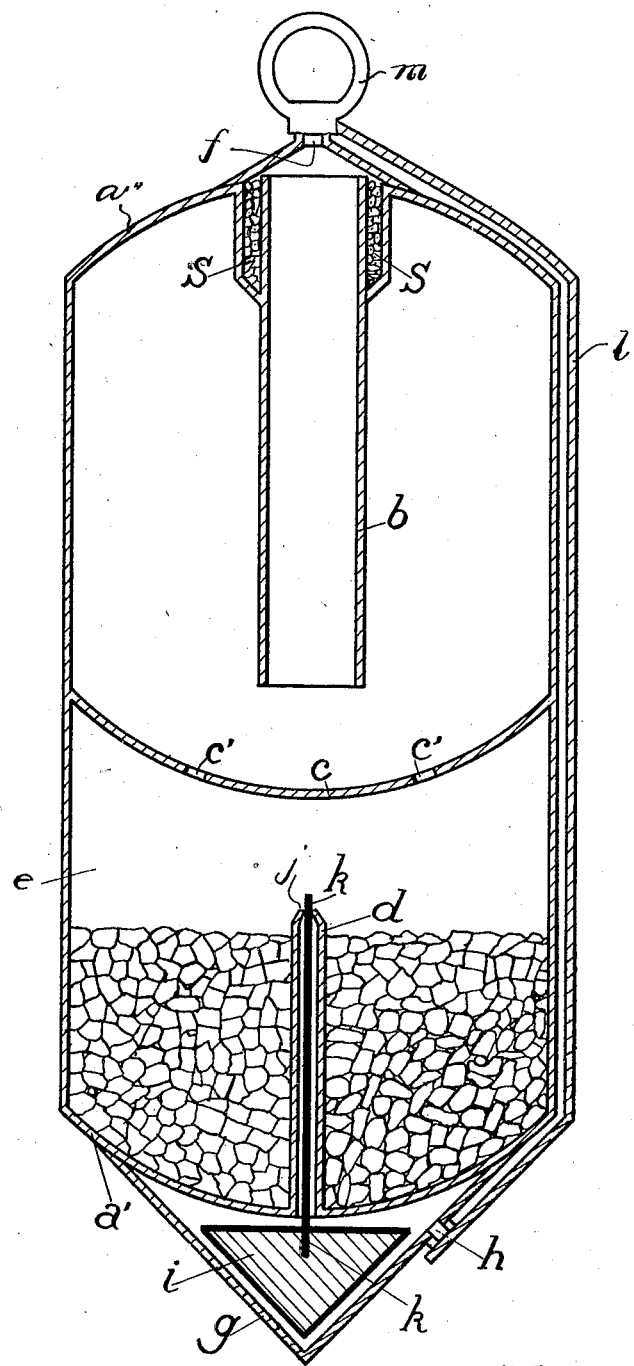

1,561,125

UNITED STATES PATENT OFFICE.

HERMANN THEM, OF DINGLINGEN, GERMANY.

SELF-IGNITING MARINE TORCH.

Application filed March 6, 1925. Serial No. 13,662.

*To all whom it may concern:*

Be it known that I, HERMANN THEM, a citizen of Germany, residing at Dinglingen, Baden, Germany, have invented certain new and useful Improvements in Self-Igniting Marine Torches, of which the following is a specification.

This invention relates to a self-igniting marine torch. In known marine torches the filling consists either of calcium phosphide which is expensive to manufacture, or of calcium carbide which however requires the arrangement of receptacles for calcium phosphide for igniting the acetylene evolved. In order that the explosive energy inherent to acetylene shall not be released the acetylene and phosphoretted hydrogen are led in separate gas ducts to near the outlet of the torch so that ignition will only take place outside the torch.

These arrangements with their small tubes, valves etc. are liable to cause the torch to fail in its operation and increase the cost of manufacture. In order to reduce such cost the present invention contemplates controlling a dropwise supply of the water by means of a needle connected to the ballast. With such a drop by drop admission of water it is possible to compose the filling of an intimate mixture of calcium phosphide and calcium carbide. If—as is usual with phosphor lights—the water were supplied freely or allowed to flood the chemicals, the calcium carbide would first become active owing to its quick gas-evolving action and the acetylene gas would force back the heavier phosphoretted hydrogen gas so that the acetylene would flow out in excess or it might explode according to the amount of air present. For this reason water should only be allowed to enter drop by drop so that only the smallest amount of water can reach at one time the two chemicals which are mixed in grains of about the size of a pea.

In order to counteract a too lively production of acetylene the calcium carbide may also be suitably prepared. Further the gas tension produced by the occasional introduction of a too large drop of water will act automatically to hinder the continued supply of water and no water will be admitted through the narrow supply tube until normal pressure has been restored.

In this manner the gas-evolving action proceeds smoothly and uniformly so that a mixture of self-igniting gases is produced, whereas with a too abundant supply of water the acetylene would be in excess and with the movement of the waves and eddies the torch would be extinguished and would not light up again so long as this condition obtains.

Manually controllable needle valves of the type usually employed for supplying water to acetylene lamps are not suitable as the torch floats freely. The impurities of the sea water must also be prevented from hindering the water supply and for this reason, according to this invention, the needle is connected to the ballast so as to be freely movable in the water supply pipe. The tossing and moving of the torch is thus transmitted to the needle in such manner as to prevent the flow of water being obstructed. The dropwise introduction of the water is obtained by suitably proportioning the length of the passage and the thickness of the needle. This arrangement is also suitable for igniting materials in a pure or unmixed condition, as the dropwise introduction of water will cause the combustion to spread over a much longer period of time and to be much more uniform than if the chemicals were flooded by the water.

The accompanying drawing illustrates by way of example a constructional form of the marine torch in vertical section.

$a$ is a casing of sheet metal having bottom and top plates $a'$ and $a''$. The lower portion of said casing forms a fuel chamber $e$ limited at the top by a partition $c$ provided with openings $c'$. In this chamber is placed the mixture of carbide and phosphide above referred to. An open tube $b$ is secured to the upper plate $a''$. $s$ is an auxiliary phosphide chamber for ensuring an immediate ignition of the torch.

To the bottom plate $a'$ is secured an upward tube $d$ extending through the mixture of chemicals and opening into the chamber $e$. at $j$. In this tube is located a needle $k$ connected to the iron ballast $i$ which rests loosely in a cup $g$ secured to the bottom of the casing. This cup $g$ is provided with a lateral opening $h$.

The opening $h$ and an outlet opening $f$ at the top of the casing are normally sealed by a metal strip $l$ which may be lightly soldered to the edges of said openings. When the torch is to be used the ring $m$ and strip $l$ are torn off and the casing $a$ is thrown into the water, say with a lifebuoy attached thereto by a cord. As the torch is immersed some water is admitted through $f$ into the receptacle $s$ and causes the torch to light up immediately, whereupon the torch floats and the admission of water takes place through the opening $h$ and the tube $d$, such admission being controlled by the needle $k$. In view of the raised position of the inlet $j$ the upward pressure of the water in tube $d$ is reduced and successive drops are delivered to the top of the mass of chemicals, whence the gases evolved escape through the holes $c'$, the tube $b$ and the burner outlet $f$.

I claim:

1. In a self-igniting marine torch, the combination of a casing, a body of ballast for weighting said casing, and means for producing a dropwise supply of water to said casing, said means comprising a narrow upward tube opening into said casing and a needle extending into said tube and connected to said body of ballast.

2. In a self-igniting marine torch, the combination of a casing, a chamber in said casing containing a mass of calcium carbide and igniting material, an upwardly extending tube adapted to deliver water to the top of said mass, a body of ballast for weighting said casing, and a needle in said tube for controlling the supply of water therethrough, said needle being connected to said body of ballast.

3. In a self-igniting marine torch, the combination of a casing, a chamber in said casing containing a mixture of calcium carbide and igniting material, a cup secured to said casing below said chamber, said cup having a lateral opening, a body of ballast loosely placed in said cup, a tube connecting said cup with said chamber and projecting into said chamber, and a needle connected to said body of ballast and extending into said tube.

In testimony whereof I have hereunto affixed my signature.

HERMANN THEM.